A. Rank.
Harvester Dropper.
No. 88209.   Patented Mar. 23, 1869.

Witnesses.
Joel S. Peyton
John J. Chew

Inventor.
Amos Rank
by his Atty
Wm. D. Baldwin

Sheet 2. 2 Sheets.

UNITED STATES PATENT OFFICE.

AMOS RANK, OF SALEM, OHIO.

IMPROVEMENT IN HARVESTERS.

Specification forming part of Letters Patent No. 88,209, dated March 23, 1869.

*To all whom it may concern:*

Be it known that I, AMOS RANK, of Salem, in the county of Columbiana and State of Ohio, have invented certain new and useful Improvements in Harvesters, of which the following is a full, clear, and exact description.

The first part of my invention relates to the discharge of the cut grain from the platform of a harvester. Its object is to deliver the grain in regular compact gavels out of the path of the team in the succeeding tour of the machine around the field; and the invention consists—

First. In mounting a discharging device, consisting of what I call an "oscillating rake" or a series of rakes, on a shoe or shoes secured to the finger-beam, whereby I attain a firm support for the rakes and a space in which to locate the rake-driving mechanism beneath the rakes, while avoiding the necessity of using a heavy supporting-frame.

Second. My invention further consists in a novel method of automatically, intermittently, and successively operating a series of oscillating rakes or discharging devices in one direction by a positive motion from the main axle without rigid connections between the two.

Third. My invention further consists in a novel method of automatically operating a discharging device, consisting of what I call a "rake" or a series of rakes, oscillating at an angle to the finger-beam, by means of a slide-bar reciprocating parallel with the finger-beam, and carrying studs acting at proper intervals on wipers on the rake-shafts to lift the teeth and recoil-springs to throw them down.

Fourth. My invention further consists in a novel method of mounting the vibrating driving-lever in a bracket adjustable on the main frame.

Fifth. The next part of my invention relates to the reel. Its object is to render the ribs adjustable at either or both ends; and the improvement consists in a novel method of constructing each reel-rib in two pieces, with a series of holes or adjusting-slots at each end, so that they may be lengthened or shortened laterally and secured in any desired position by the sections being bolted to the reel-arms and to each other.

Figure 1:
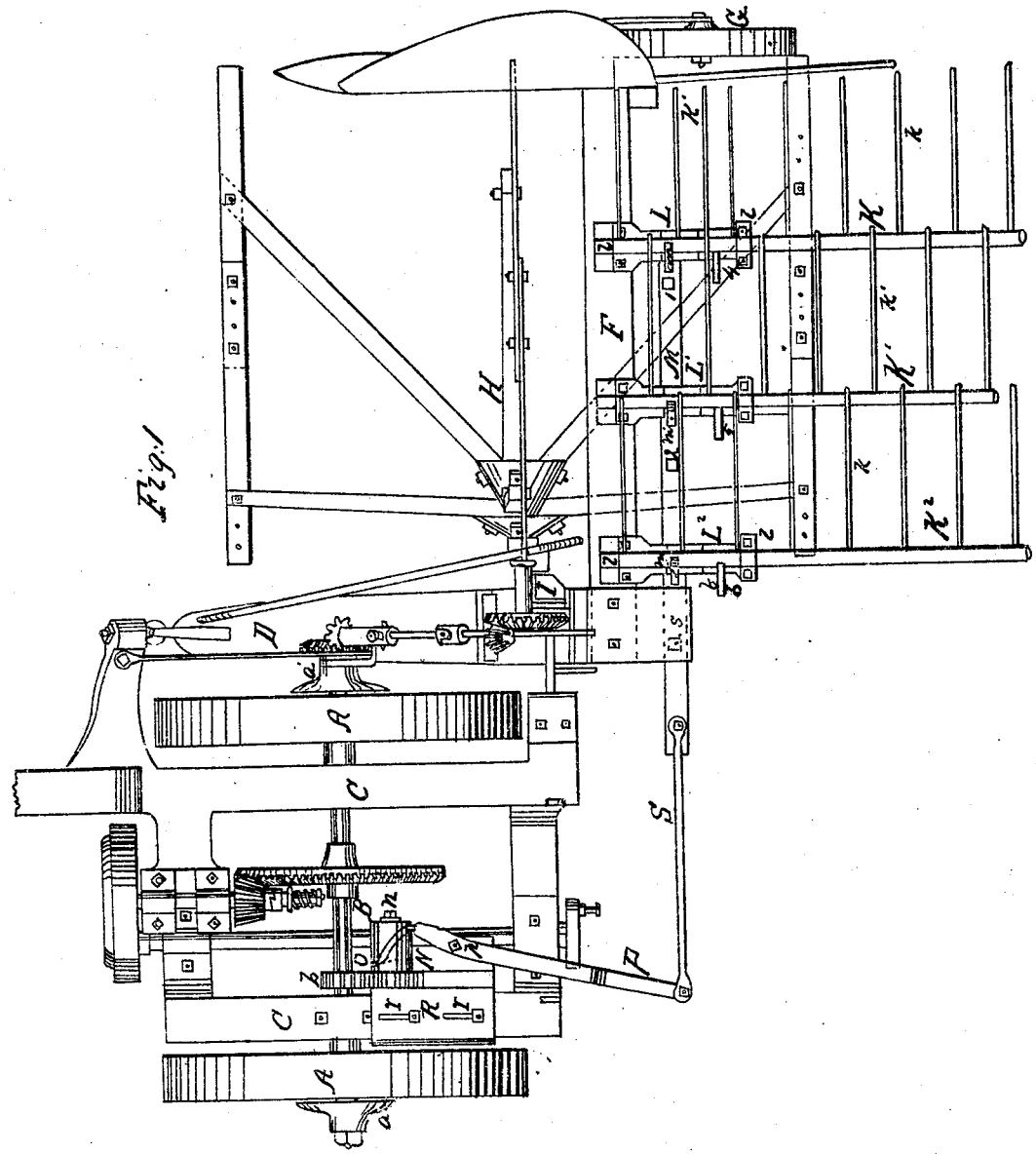
Figure 2:
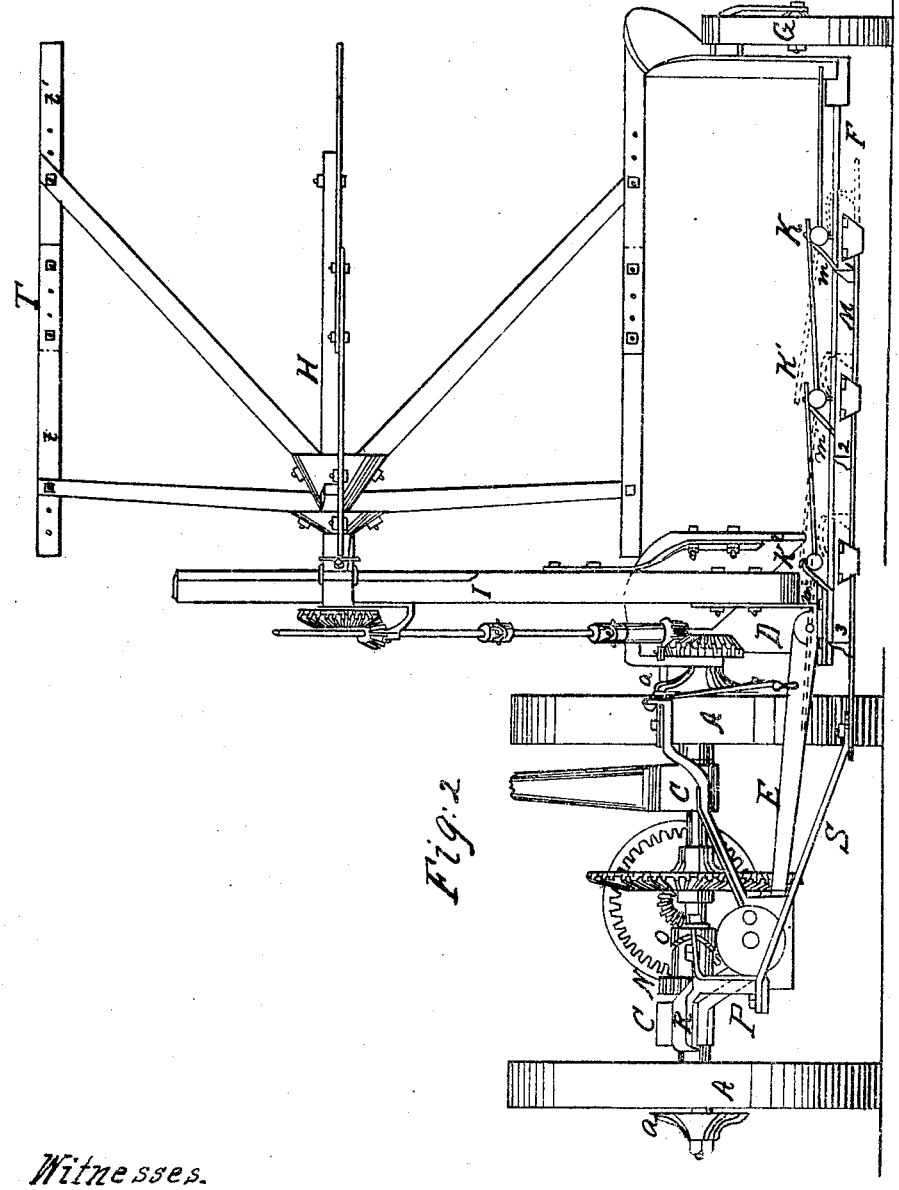

In the accompanying drawings, Figure 1 is a plan, and Fig. 2 a rear elevation, of a harvester in which all my improvements are embodied.

A A' are the driving-wheels, turning loosely on an axle, B, with which they are locked by backing-ratchets $a$. A main or gear frame, C, is, by preference, made of metal, and mounted on the main axle between the wheels. A finger-beam, F, is hinged to the main frame by a drag-bar, D, and coupling-arm E, in the usual manner. A grain-wheel, G, mounted on a swinging arm, supports the divider end of the finger-beam, while the stubble or heel end is, when reaping, suspended from the main frame by a cord or chain, $e$, as is well understood.

An overhanging reel, H, is mounted on a post, I, directly over the shoe, and can be adjusted up or down by a bracket, collar, and set-screw. The reel may be driven by gearing from the main axle, or in any other suitable well-known way.

The machine is, of course, to be supplied with all the appliances of a fully-organized harvester, which need not be specified here.

In this instance I have shown three oscillating slatted platform sections or rakes, K $K^1$ $K^2$, arranged at right angles to the finger-beam, or nearly so, and turning in bearings $l$ in brackets or shoes L $L^1$ $L^2$ secured to the finger-beam. The distances between the bearings are, it will be seen, by preference made short, and the rakes allowed to project beyond them, the weight of the machine being thus lessened. The front ends of the rakes, in this instance, are shown as mounted on the finger-beam; but it is obvious that they might, with good effect, be made flush with or even be arranged below the beam.

The teeth $k$ of the rakes, it will be observed, alternate with each other and overlap the shafts of the adjacent rakes, by which means each one in succession strips or clears the other.

By prolonging one or two of the teeth of the secondary rake or rakes, as at $k'$, Fig. 1, they may be made to act as guard-rods or cut-offs, to receive the cut grain which falls while the rake-teeth are vertical, and by flattening these teeth vertically they will be elastic enough to yield when struck by the reel, while rigid enough to support the falling grain.

Each rake is provided with a swinging stop or wiper, $m$ $m^1$ $m^2$, which at the proper moment is acted on by its respective stud 1 2 3 on a reciprocating slide, M, which works in suitable guides in the shoes or brackets which support the rakes. The rakes are thus raised by the studs to discharge the gavel. When released springs 4 5 6 on the rake-shafts return the rakes to their normal position. The rakes in this instance are driven by a pinion, $b$, on the main axle, which drives a corresponding pinion, N, on a counter-shaft, $n$, carrying a cam-guide, O, in which one end of a vibrating lever, P, works. This lever is pivoted on a bracket, R, adjustable on the main frame, by means of slots $r$ and set-screws, to set the lever closer to or farther from the counter-shaft.

The fulcrum $p$ of the lever may be adjusted in a similar way, to vary its range of motion, and consequently the stroke of the slide-bar M, with which the lever P is connected by a pitman, S.

Rakes oscillating at right angles to a finger-beam and mounted in a frame vibrating on an axis parallel to the finger-beam have been patented; but such devices necessitate the lifting of the platform, rakes, and grain by the hand of the driver at every discharge of the gavel.

The reel-ribs T are made in two sections, $t\ t'$, and provided with slots at each end, or a series of holes, through which the fastening-bolts pass. One of these bolts passes through each reel-arm, and the overlapping inner ends of each section are bolted together in a similar way.

I am aware that provision has been made for shortening the reel-ribs at the divider end; but I am not aware of any device which permits either or both ends of the ribs to be extended or retracted, and this feature under some conditions of the grain is very useful.

The operation of the machine is as follows, the parts starting from the position shown in the drawings: As the machine advances through the standing grain, the stalks are pressed back by the reel, severed by the cutting apparatus, and fall upon the platforms. The cam-guide vibrates the slide-bar M toward the grain side of the machine, the stud 1 strikes the swinging stud $m$, and oscillates the first section of the platform or rake K. As the teeth of this rake approach a vertical position the second stud, 2, on the slide-bar strikes the tappe $m^1$ on the second rake or section of the platform, which rises quickly, clearing the grain from the first one, which is at the same time released by the stud escaping from the wiper and thrown down by the spring 3. As the teeth of the second rake pass the perpendicular the third rake rises and the second one is thrown down, while the grain is discharged by the third rake upon the ground. The prolonged teeth $k'$ act as guard-rods or cut-offs, to receive the grain which falls while the rake-teeth are vertical.

I propose also to use with a rake or rakes of this kind the vibrating cut-off shown in my patent of June 30, 1868, or any other suitable well-known cut-off used in this class of machines.

What I claim as my invention, and desire to secure by Letters Patent, is—

1. The combination, with the finger-beam, of oscillating platform sections or rakes, having their bearings in supporting shoes or brackets attached to the finger-beam, for the purposes specified.

2. The combination, substantially as set forth, with oscillating platform sections or rakes, of an automatically-operated reciprocating driving-bar, for alternately and successively oscillating the rakes by a positive motion from the main axle without rigid connections.

3. The combination, substantially as set forth, of oscillating platforms or rakes, carrying recoil-springs and swinging wipers, with studs on a slide-bar moving parallel to the finger-beam.

4. The combination of the cam-guide, vibrating lever, and adjustable bracket, as set forth.

5. The reel-ribs constructed in two pieces, as described, and adjustable at either end.

In testimony whereof I have hereunto subscribed my name.

AMOS RANK.

Witnesses:
  THOS. S. BAIRD,
  C. W. CADWALLADER.